US008848931B2

(12) United States Patent
Schaule et al.

(10) Patent No.: US 8,848,931 B2

(45) Date of Patent: Sep. 30, 2014

(54) METHOD AND DEVICE FOR TESTING AND CALIBRATING ELECTRONIC SEMICONDUCTOR COMPONENTS WHICH CONVERT SOUND INTO ELECTRICAL SIGNALS

(75) Inventors: Max Schaule, Mindelheim (DE); Arnfried Kiermeier, Oberaudorf (DE); Stefan Binder, Rosenheim (DE)

(73) Assignee: Multitest Elektronische Systeme GmbH, Rosenheim (DE)

( * ) Notice: Subject to any disclaimer, the term of this patent is extended or adjusted under 35 U.S.C. 154(b) by 663 days.

(21) Appl. No.: 12/810,716

(22) PCT Filed: Mar. 12, 2009

(86) PCT No.: PCT/EP2009/001798

§ 371 (c)(1), (2), (4) Date: Jun. 25, 2010

(87) PCT Pub. No.: WO2009/118101

PCT Pub. Date: Oct. 1, 2009

(65) Prior Publication Data

US 2010/0290634 A1 Nov. 18, 2010

(30) Foreign Application Priority Data

Mar. 27, 2008 (DE) ........................ 10 2008 015 916

(51) Int. Cl.

| | |
|---|---|
| ***H04R 29/00*** | (2006.01) |
| *G01M 1/14* | (2006.01) |
| *G01N 29/00* | (2006.01) |
| *G01V 13/00* | (2006.01) |
| *G01M 7/00* | (2006.01) |
| *H04R 17/00* | (2006.01) |
| *H04R 19/00* | (2006.01) |

(52) U.S. Cl.

CPC .............. *H04R 29/004* (2013.01); *H04R 17/00* (2013.01); *H04R 19/005* (2013.01)

USPC .................. 381/58; 381/59; 381/60; 73/1.82; 73/571

(58) Field of Classification Search

USPC .......................... 381/58, 59, 60; 73/1.85, 571

See application file for complete search history.

(56) References Cited

U.S. PATENT DOCUMENTS 3,396,812 A * 8/1968 Wilcox et al. ................ 181/250

5,128,905 A * 7/1992 Arnott .......................... 367/140

(Continued)

FOREIGN PATENT DOCUMENTS

| | | |
|---|---|---|
| DE | 10 2004 018 301 | 11/2004 |
| EP | 0 813 350 | 12/1997 |

(Continued)

OTHER PUBLICATIONS

Field, C.D., and Fricke, F.R., "Theory and Application of Quarter-wave Resonators: A Prelud to Their Use for Attenuating Noise Entering Buildings Through Ventilation Openings," 1997, Elsevier Science Ltd. vol. 53, No. 1-3, pp. 117-132.*

(Continued)

*Primary Examiner* — Matthew Eason

*Assistant Examiner* — Sean H Nguyen

(74) *Attorney, Agent, or Firm* — Nixon & Vanderhye P.C.

(57) ABSTRACT

A method for testing and calibrating electronic semiconductor components which convert sound into electrical signals acoustically irradiates the components in a sound chamber whose largest free length is less than half the wavelength of the highest frequency of the sound waves produced during the test.

9 Claims, 2 Drawing Sheets

(56) References Cited

U.S. PATENT DOCUMENTS

Figure 1:
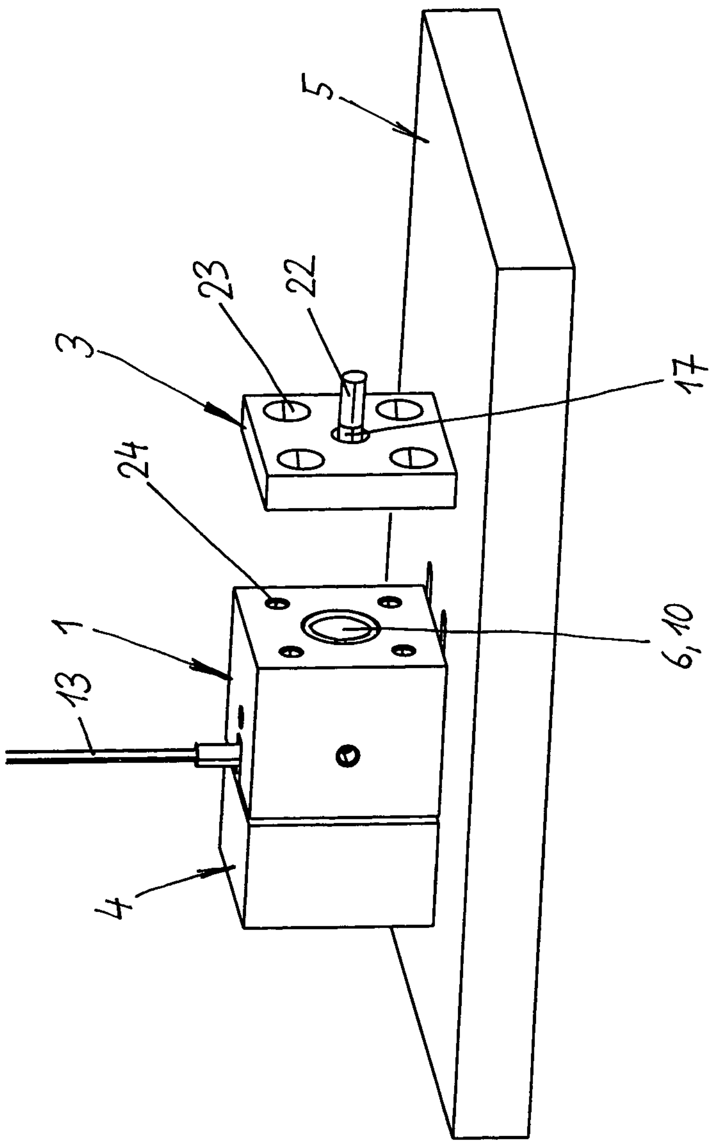

| | | | | |
|---|---|---|---|---|
| 6,111,336 | A * | 8/2000 | Yoshida et al. | 310/328 |
| 6,116,375 | A * | 9/2000 | Lorch et al. | 181/224 |
| 6,968,053 | B1 | 11/2005 | Ray | |
| 2007/0144263 | A1* | 6/2007 | Fei et al. | 73/644 |

FOREIGN PATENT DOCUMENTS

| | | |
|---|---|---|
| JP | 2001-352598 | 12/2001 |
| JP | 2006-308567 | 11/2006 |

OTHER PUBLICATIONS

International Search Report for PCT/EP2009/001798, mailed Oct. 5, 2009.

Neumann, J.J. et al., "CMOS-MEMS membrane for audio-frequency acoustic actuation", Sensors and Actuators A, vol. 95, No, 2-3, (Jan. 1, 2002), pp. 175-182.

Bruel et al., "Ear Simulator—Type 4157", Product Data, [Online], (Jan. 2008).

* cited by examiner

METHOD AND DEVICE FOR TESTING AND CALIBRATING ELECTRONIC SEMICONDUCTOR COMPONENTS WHICH CONVERT SOUND INTO ELECTRICAL SIGNALS

This application is the U.S. national phase of International Application No. PCT/EP2009/001798 filed 12 Mar. 2009, which designated the U.S. and claims priority to German Application No. DE 10 2008 015 916.6 filed 27 Mar. 2008, the entire contents of each of which are hereby incorporated by reference.

The invention relates to a method and device for testing and calibrating electronic semiconductor components which convert sound into electrical signals, according to the preambles of claim 1 and claim 4 respectively.

Semiconductor components of this type are for example incorporated into microphones and are known as MEMS (micro-electro-mechanical system) components. To test and calibrate semiconductor components of this type, they are exposed to sound waves of specific frequencies in a sealed sound chamber. The terminals of the components are connected to an electronic computing means, which checks the output signals of the semiconductor components. For sound production, it is known to use piezo elements, which make it possible to produce the desired frequencies in the sound chamber.

JP 2006-308 567 A discloses a method according to the preamble of claim 1, in which microphones are tested and calibrated at 1,000 Hz for example. Furthermore, DE 10 2004 018 301 A1 discloses electro-acoustic converters in the form of piezo elements. EP 0 813 350 A2 discloses a device for measuring the characteristic curve of a microphone, in particular a pressure microphone or directional microphone under free field conditions, a tubular sound wave conductor being provided comprising an end portion filled with a sound absorbing material to prevent standing waves.

It has been found that conventional test devices of this type do not always operate with the desired precision. The object of the invention is therefore to provide a method and a device of the type mentioned at the outset with which tests and calibrations of semiconductor components which convert sound waves into electrical signals can be carried out in a particularly precise and reliable manner.

This object is achieved according to the invention by a method and device having the features of claim 1 and claim 4 respectively. Advantageous embodiments of the invention are disclosed in the sub-claims.

In the method according to the invention, the semiconductor components are exposed to sound in a sound chamber of which the greatest clear length is less than 21 mm, in such a way that for sound wave frequencies of up to 8,000 Hz, the greatest clear length of the sound chamber is less than half the wavelength of the highest frequency of these sound wave frequencies. In accordance with the invention, it has been found that if the greatest clear length of the sound chamber is less than half the wavelength of the highest frequency of the sound waves produced by the piezo element, standing waves which might distort the test result can be prevented within the sound chamber. Since according to the invention the greatest clear length of the sound chamber is less than 21 mm, standing waves can be prevented for sound wave frequencies of up to 8,000 Hz. This frequency range of up to 8,000 Hz normally includes at least a considerable portion of the conventional test frequency range, in such a way that at least a considerable proportion of the standing waves which conventionally form can be prevented. In this way, the testing and calibration of the electronic semiconductor components may be carried out in a particularly precise manner.

For a given frequency, the wavelength can be calculated easily using the formula $$\lambda = \frac{c}{f}$$

in which lambda ("λ") is the wavelength, "c" is the speed of sound (343 m/s) and "f" is the frequency (Hz) of the sound waves produced by the piezo element. For example, this results in a wavelength λ of 42.9 mm at 8,000 Hz, and according to the invention this leads to the greatest clear length of the sound chamber being approximately 21 mm. In this case, the greatest clear length is considered to be any continuous clear path in a straight line within the sound chamber, over which path the sound can propagate without obstruction. This greatest clear length need not be parallel or perpendicular to the longitudinal axis of the sound chamber, but may be at any orientation thereto, for example diagonal thereto.

The frequency ranges over which the semiconductor components are tested may vary greatly depending on the intended use and on the type of the semiconductor component. For many applications, the lower boundary of the frequency range is approximately 20 Hz. If the semiconductor components are to be used in sensitive microphones, the tested frequency range expediently extends up to 20,000 Hz. A frequency range with an upper boundary of 10,000 Hz may be sufficient if the semiconductor components are used in less sensitive microphones. In telephone microphones, because of the limited transmission capacity of microphones of this type, the upper boundary for the frequency range to be tested is conventionally 8,000 Hz. In this case, the upper frequency range is generally more important than the lower frequency range. If the highest frequency of the tested frequency range is 20,000 Hz or 10,000 Hz, the semiconductor components are preferably measured in a sound chamber of which the greatest clear length is less than 8.6 mm or 17 mm respectively, because in this case standing waves can be prevented over the entire frequency range up to 20,000 Hz or 10,000 Hz. However, the three above-mentioned frequency upper boundaries are merely particularly preferred embodiments, and the semiconductor components can readily be tested and calibrated up to any other desired frequency upper boundary.

In the device according to claim 4, the housing comprises a central housing part having a hollow chamber which is open at the end face and in which the piezo module is flexibly mounted at a distance from the side walls of said hollow chamber. For example, the piezo module may be held in the central housing part by a flexible O-ring, causing the piezo module to be largely acoustically decoupled from the central housing part. Moreover, an inertial mass member having a greater mass than the piezo module is arranged adjacent to the central housing part, the piezo module being supported against said member. It is expedient for this inertial mass member to be vibrationally decoupled from the central housing part. This means that vibrations are not induced in the central housing part when sound is produced and that the sound distortions which this might produce can be excluded.

It is expedient for the inertial mass member to be adhesively bonded to the piezo module. This makes it possible to prevent the piezo module from becoming detached from the inertial mass member, since this would reduce or negate the effect of the inertial mass member.

In an advantageous embodiment, the housing comprises a housing lid which can be brought into contact with the central housing part to seal off the hollow chamber, and which comprises a component holding means for holding the semiconductor component in the sound chamber. In this case, it is expedient for the housing lid to be rigidly coupled to the central housing part. In this way, the central housing part forms together with the housing lid a large, coherent mass, which surrounds the sound chamber, making it possible to produce a particularly high-quality, low-distortion sound chamber.

In an advantageous embodiment, at least the central housing part is mounted on an insulating part preventing the transmission of structure-borne sound. This makes it possible to prevent structure-borne sound, which may for example be produced in a handling device, surrounding the device according to the invention, for electronic components (handler), from being transmitted to the test device, as this would have a negative effect on the test results and the calibration. It is expedient for all the parts of the device to which external structure-borne sound might be transmitted to be suitably insulated.

Figure 2:
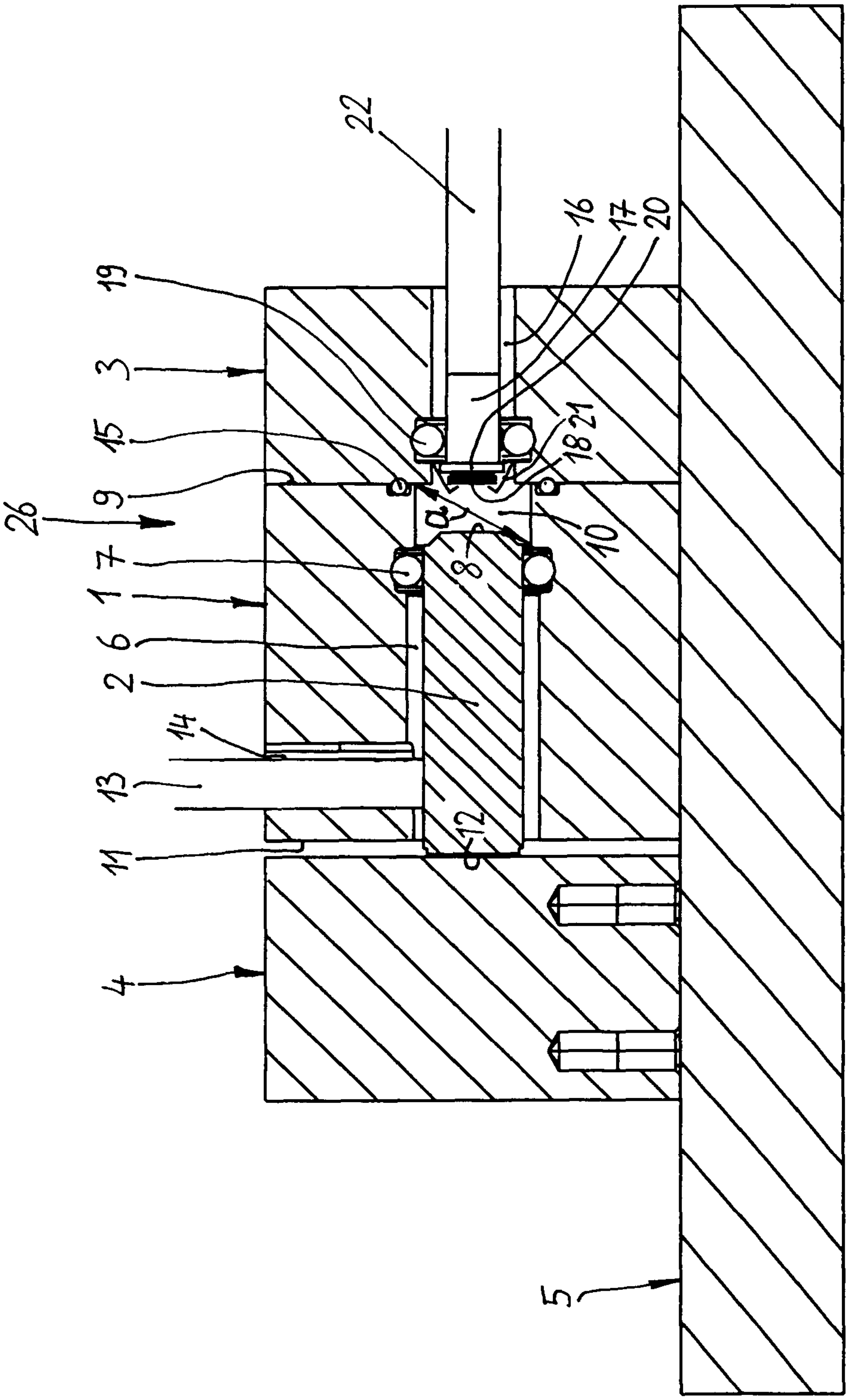

In the following, the invention is described in greater detail by way of example with reference to the drawings, in which:

FIG. 1 is a schematic, three-dimensional view of the device according to the invention with the housing lid open; and FIG. 2 is a longitudinal section through the device of FIG. 1 during testing.

As can be seen from FIGS. 1 and 2, the device according to the invention comprises a central housing part 1, a sound production means having a piezo module 2 arranged within the central housing part 1, a housing lid 3 and an inertial mass member 4. The central housing part 1 and the housing lid 3 together form a housing 26. For the piezo module 2 shown in FIG. 2, the housing thereof is merely shown schematically. Within this housing, a piezo element (not shown) in the form of a piezo crystal or of polycrystalline ceramic material is located, the piezo element acting as a piezo actuator, i.e. converting voltage into mechanical motion. The piezo element is expediently arranged in the region of an opening which is located in the front end wall 8 of the piezo module 2.

The central housing part 1 and the inertial mass member 4 are fixed on a base plate 5. This base plate 5 may be an insulating part which prevents the transmission of external structure-borne sound to the device. Alternatively, the base plate 5 may also be a rigid component which is itself fixed to an insulating part of this type.

The central housing part 1 is a solid, square part of a relatively high mass, preferably made of steel. The piezo module 2 is formed in a substantially cylindrical shape and comprises a diameter which is less than the diameter of the hollow chamber 6. The piezo module 2 is held radially centrally within the hollow chamber 6 by an O-ring 7 in such a way that the peripheral wall of the piezo module 2 does not touch the inner peripheral wall of the hollow chamber 6. The O-ring 7 consists of a relatively flexible, resilient material, in such a way that the piezo module 2 is flexibly coupled to the central housing part 1 and vibrations produced by the piezo module 2 are not transmitted, or are transmitted only to a negligible extent, to the central housing part 1.

The front end wall 8 of the piezo module 2 is offset back from the front end wall 9 of the central housing part 1, in such a way that a front hollow chamber portion is formed and acts as a sound chamber 10. The sound chamber 10 is thus basically delimited on one side by the front end wall 8 of the piezo module 2. The annular gap between the piezo module 2 and the inner peripheral wall of the central housing part 1 is sealed off by the O-ring 7.

The rear end of the piezo module 2 protrudes beyond the hollow chamber 6 and thus projects beyond the rear end wall 11 of the central housing part 1. The rear end wall 12 of the piezo module 2 lies against the inertial mass member 4 and is rigidly coupled thereto. It is expedient for the piezo module 2 to be adhesively bonded to the inertial mass member 4. In this way it is possible, in a simple manner without additional resources, to ensure that the piezo module 2 is also held centrally in the hollow chamber 6 in the rear end region of said module in such a way as not to touch the side walls of the hollow chamber 6. Alternatively, however, an O-ring or a similar resilient holding means may also readily be provided in the rear end region of the piezo module 2 to centre said piezo module 2 radially within the hollow chamber 6. The inertial mass member 4 makes it possible for sound to be produced and for the test to be carried out particularly effectively and with particularly low interference, by eliminating undesired vibrations.

The electrical supply to the piezo module 2 is provided via electric lines 13 which are connected to the piezo module 2 in the rear end region of the piezo module 2, i.e. outside the sound chamber 10. The lines 13 may be guided through a recess or groove 14 which extends radially outwards from the hollow chamber 6.

In the embodiment shown, the housing lid 3 also consists of a square plate of a relatively high mass, preferably also made of steel.

The housing lid 3 can be detachably connected to the central housing part 1 and is positioned on the end face of the central housing part 1 for this purpose. In this case, the housing lid 3 lies in a planar manner on the front end wall 9 of the central housing part 1 in such a way as to be rigidly coupled thereto. The sealing between the housing lid 3 and the central housing part 1 is provided by an O-ring 15, which lies in an annular groove which is introduced into the end face of the central housing part 1 outside the sound chamber 10. Alternatively, the O-ring 15 could also be fixed to the housing lid 3.

The housing lid 3 comprises an axial hollow chamber 16 which is aligned with the hollow chamber 6 of the central housing part 1. A holding head 17 for a semiconductor component 18 which is to be tested and/or calibrated is held in this hollow chamber 16 by means of an O-ring 19 which surrounds the holding head 17. The holding head 17 may be part of a special test microphone which is inserted into the hollow chamber 16. On the end face facing towards the piezo module 2, the holding head 17 may carry a plate 20 in which resilient contact pins, for example in the form of pogo pins, are mounted. The semiconductor component 18 to be tested is positioned on the holding head 17 and held on this by schematically shown fixing means, for example in the form of clamps, in such a way that the terminals of the semiconductor component 18 contact the associated contact pins of the holding head 17. The contact pins are in turn connected via electric lines 22 to the electronic arithmetic-logic unit in which the tests are evaluated.

In the case of a manually operated device, as in the embodiment shown, the housing lid 3 may be fixed to the central housing part 1 by means of screws 23, which penetrate through the housing lid 3 and can be screwed into corresponding threaded holes 24 of the central housing part 1 (FIG. 1). Alternatively, the device may also be configured in such a way that the semiconductor components 18 to be tested are automatically supplied to the housing lid 3 and held there, and subsequently the housing lid 3 is guided onto the central housing part 1 to seal the sound chamber 10 and to test and optionally calibrate the semiconductor component 18.

As can be seen from FIGS. 1 and 2, it is expedient for the device shown in these figures to be aligned horizontally, i.e. for the longitudinal axis of the piezo module 2 to extend horizontally. This means that there are no masses which have to be held together by the flexible O-ring 7.

Testing is carried out in that the piezo element arranged in the piezo module 2 is supplied with power via the electric lines 13 in such a way as to vibrate at a predetermined frequency. These vibrations are transmitted to the air located in the sound chamber 10, and in this way, this air is also set in vibration. These vibrations are absorbed by the semiconductor component 18, converted into electrical signals, and passed on via the electric lines 22 to the electronic arithmetic-logic unit where they are evaluated.

To make it possible to prevent standing waves within the sound chamber 10 and thus to prevent distortion of the measurement results, the sound chamber 10 is dimensioned in such a way that the greatest clear length thereof, which in FIG. 2 is shown by a double-headed arrow and provided with the reference sign a, is less than half the wavelength $\lambda$ of the highest frequency of the sound waves produced by the piezo module 2. For example, if the maximum frequency produced by the piezo module 2 is 20,000 Hz, then 8.6 mm is half the wavelength $\lambda$. In this case, the greatest clear length a of the sound chamber 10 is less than 8.6 mm. At a maximum frequency of 25,000 Hz, the greatest clear length a is less than 6.86 mm. At a maximum test frequency of 15,000 Hz, the sound chamber 10 would be constructed in such a way that the greatest clear length a thereof would be less than 11.4 mm.

The invention claimed is:

1. Method for testing and calibrating electronic semiconductor components which convert sound into electrical signals, in which at least one semiconductor component is arranged in a sound chamber and exposed to sound waves in a predetermined frequency range which are produced by a piezo element, comprising exposing the at least one semiconductor component to sound waves of which the highest frequency is at least 8000 Hz, in a sound chamber of which the greatest clear length is less than half the wavelength ($\lambda$) of the highest frequency of the sound waves produced to thereby minimize distortion of the propagating sound waves the piezo element produces.

2. Method according to claim 1, further comprising testing the at least one semiconductor component at a maximum sound wave frequency of 20,000 Hz in a sound chamber of which the greatest clear length is less than 8.6 mm.

3. Method according to claim 1, further comprising testing the at least one semiconductor component at a maximum sound wave frequency of 10,000 Hz in a sound chamber of which the greatest clear length is less than 17 mm.

4. Method according to claim 1, further comprising testing the at least one semiconductor component at a maximum sound wave frequency of 8,000 Hz in a sound chamber of which the greatest clear length is less than 21 mm.

5. Device for carrying out the method according to claim 1, comprising a housing, the sound chamber which is located within the housing and in which the at least one semiconductor component can be arranged, a sound production means comprising the piezo element for producing sound waves in the sound chamber, wherein the housing comprises a central housing part having a hollow chamber which is open at the end face and in which the piezo element is flexibly mounted at a distance from the side walls of the hollow chamber, and in that an inertial mass member having a greater mass than the piezo element is arranged adjacent to the central housing part and the piezo element is supported on this member.

6. Device according to claim 5, wherein the inertial mass member is adhesively bonded to the piezo element.

7. A system for testing electronic semiconductor components of the type which convert sound into electrical signals, comprising:

a sound chamber into which at least one semiconductor component is disposed;

at least one piezo element acoustically coupled to the sound chamber, the piezo element producing sound waves of which the highest frequency is at least 8 kHz that propagate within the sound chamber and impinge upon the at least one semiconductor component, wherein the sound chamber has a greatest free length that is less than half the wavelength ($\lambda$) of said highest frequency to minimize distortion of the propagating sound waves the piezo element produces.

8. The method of claim 1 wherein the chamber is dimensioned to prevent or minimize standing waves within the chamber of the propagating sound waves the piezo element produces.

9. A system for testing electronic semiconductor components of the type which convert sound into electrical signals, comprising:

a sound chamber configured and dimensioned to accept at least one semiconductor component therein;

at least one frequency excitation element acoustically coupled to the sound chamber, the frequency excitation element producing sound waves over a range of which the highest frequency is at least 8 kHz, the sound waves propagating within the sound chamber to impinge upon the at least one semiconductor component, the sound chamber having no continuous clear path in a straight line over which path the sound waves can propagate without obstruction, that is half the wavelength ($\lambda$) or more of the highest frequency of the sound waves produced by the frequency excitation element, the sound chamber being structured and dimensioned to avoid resonance and minimize distortion within the frequency range of sound waves the frequency excitation element produces.

* * * * *